US012012804B2

(12) United States Patent
Cleavenger

(10) Patent No.: US 12,012,804 B2
(45) Date of Patent: Jun. 18, 2024

(54) PROTECTOR FOR USE WITH A DOOR

(71) Applicant: Carl Cleavenger, Ventura, CA (US)

(72) Inventor: Carl Cleavenger, Ventura, CA (US)

(73) Assignee: Carl Cleavenger, Ventura, CA (US)

( * ) Notice: Subject to any disclaimer, the term of this patent is extended or adjusted under 35 U.S.C. 154(b) by 128 days.

(21) Appl. No.: 17/691,864

(22) Filed: Mar. 10, 2022

(65) Prior Publication Data

US 2022/0298849 A1 Sep. 22, 2022

Related U.S. Application Data

(60) Provisional application No. 63/162,401, filed on Mar. 17, 2021.

(51) Int. Cl.

| | |
|---|---|
| ***E05D 15/16*** | (2006.01) |
| ***E06B 3/48*** | (2006.01) |
| ***E06B 9/15*** | (2006.01) |
| ***E06B 9/17*** | (2006.01) |
| ***E06B 9/18*** | (2006.01) |
| ***E06B 9/58*** | (2006.01) |

(52) U.S. Cl.
CPC .................. *E06B 9/17* (2013.01); *E06B 3/48* (2013.01); *E06B 9/15* (2013.01); *E06B 9/18* (2013.01); *E06B 9/58* (2013.01)

(58) Field of Classification Search
CPC ....... E05D 15/24; E05D 15/242; E05D 15/16; E05D 15/165; E05D 11/02; E05Y 2900/106; E06B 9/15; E06B 9/17; E06B 9/171; E06B 9/173; E06B 9/18; E06B 9/58; E06B 3/48; E06B 3/485; E06B 2009/1743
See application file for complete search history.

(56) References Cited

U.S. PATENT DOCUMENTS 2,805,107 A * 9/1957 Van ........................ E05D 15/063 384/449
3,319,697 A * 5/1967 Krohn ...................... E06B 7/367 160/229.1
4,141,403 A * 2/1979 Church .................... E05D 15/24 160/201

(Continued)

FOREIGN PATENT DOCUMENTS

AT 11753 U1 * 2/2011 ......... E05D 11/0054

*Primary Examiner* — Chuck Y Mah

(74) *Attorney, Agent, or Firm* — Ferguson Case Orr Paterson

(57) ABSTRACT

This disclosure relates generally to protecting roller devices and assemblies that prevent damage caused by doors, such as garage doors. The protecting roller devices can include two separable portions each having a wheel at one end, with a connection portion therebetween. In some embodiments, the connecting portion passes through a hollow axle of a hinge to connect the separable portions. In some other embodiments, the protecting roller device can comprise a middle portion that can be connected to the hinge, such as using a fastener. The highest point of the protecting roller device can be above the highest point of the hinge, such that the protecting roller device will encounter an obstruction such as an automobile instead of the hinge. The protecting roller device can be made of a material designed to prevent or minimize damage to the obstruction.

18 Claims, 15 Drawing Sheets

(56) References Cited

U.S. PATENT DOCUMENTS 5,356,209 A * 10/1994 Hill ........................ A63C 17/06
280/11.223
6,527,036 B1 * 3/2003 Welsh ................... E05D 15/242
16/370
6,718,595 B1 * 4/2004 Berger, Jr. ................ E05D 5/14
16/273
6,883,205 B2 * 4/2005 Martinez-Munoz .........................
E05D 11/0054
16/250
7,178,197 B2 * 2/2007 Verheye, Sr. ....... E05D 11/0054
160/229.1
9,394,734 B1 * 7/2016 Berger .................... E05D 11/02
9,708,841 B1 * 7/2017 Kar ..................... E05D 11/0054
2005/0269043 A1 * 12/2005 Welsh ................... E05D 15/242
160/229.1
2005/0273976 A1 * 12/2005 Sarver ................... E05D 15/242
16/242
2014/0090204 A1 * 4/2014 Sarnowski ................ E05D 3/02
16/340
2016/0115723 A1 * 4/2016 Beeson ................. E05F 15/681
49/426
2017/0356239 A1 * 12/2017 Ouyang .................... E06B 9/80
2018/0305963 A1 * 10/2018 Wunderle ............. E05D 15/242
2019/0106919 A1 * 4/2019 Kelley .................. E05D 15/242
2019/0186189 A1 * 6/2019 Yost ........................ E05D 11/00
2020/0190898 A1 * 6/2020 Otoski ...................... E05F 5/06

* cited by examiner

300

PROTECTOR FOR USE WITH A DOOR

BACKGROUND OF THE DISCLOSURE

Field of the Disclosure

Embodiments of the present disclosure relate to devices for preventing damage caused by doors, such as damage caused by garage doors.

Related Art

FIG. 1 shows a typical prior art garage door 100. The garage door 100 includes four panels **100*a*,100*b*,100*c*,100*d*, and is mounted on tracks 102. The garage door 100 also includes hinges 200, which in this case are center hinges, and side hinges 200*a* which can be similar to the center hinges 200. The side hinges 200*a* can also include rollers within the tracks 102**.

FIG. 2 shows a close-up view of the hinge 200. The hinge 200 can include a first hinge portion 202 and a second hinge portion 204, which in this case are upper and lower hinge portions, respectively. The hinge 200 can also include an axle 206, about which the hinge portion 202 and/or the hinge portion 204 can rotate. The hinge 200 can be attached to the garage door 100 via one or more fasteners 208 (in this case, four fasteners), or other methods as known in the art. The hinge portions 202,204 can be attached to different panels, in this case the panels **100*a*,100*b*. As the garage door 100 is raised, the panel 100*a* and hinge portion 202 will begin to rotate about the axis of the axle 206, followed the panel 100*b* and its associated hinge portions, etc., until the garage door is in its stored upward position, roughly parallel to the ceiling. Similarly, when the garage door 100 is closed, the panels 100*a*,100*b* begin in a substantially horizontal position, and as the garage door 100 is closed, the panel 100*b* and second hinge portion 204 will rotate into a vertical position about the axle 206, to be followed by the panel 100*a* and the first hinge portion 202**.

Prior art hinges such as the hinges 200,**200*a* can be problematic, in that they can cause damage to objects that are too near the closing garage door 100, such as the rear or front end of a car. Because the hinges 200 stick out from the garage door 100, the body of the garage door may still have clearance to close without abutting the object, but the hinge 200** may strike the object (e.g. car), causing cosmetic and/or structural damage.

SUMMARY OF THE DISCLOSURE

One embodiment of a protecting roller device according to the present disclosure comprises first and second portions each comprising a wheel. The first and second portions are separable from one another. A connecting portion connects the first and second portions.

One embodiment of a protecting roller assembly according to the present disclosure comprises a hinge and a protecting roller device connected to the hinge. The protecting roller device includes first and second portions each including a wheel, and a connecting portion connecting the first and second portions.

One embodiment of a garage door system according to the present disclosure includes a garage door with first and second panels, and a hinge connecting the first and second panels. The system further comprises a protecting roller device with a first portion with a first wheel, a second portion with a second wheel, and a connecting portion connecting the first and second portions. A highest point of the protecting roller device is higher than a highest point of the hinge.

This has outlined, rather broadly, the features and technical advantages of the present disclosure so that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION OF THE DISCLOSURE

Figure 1:
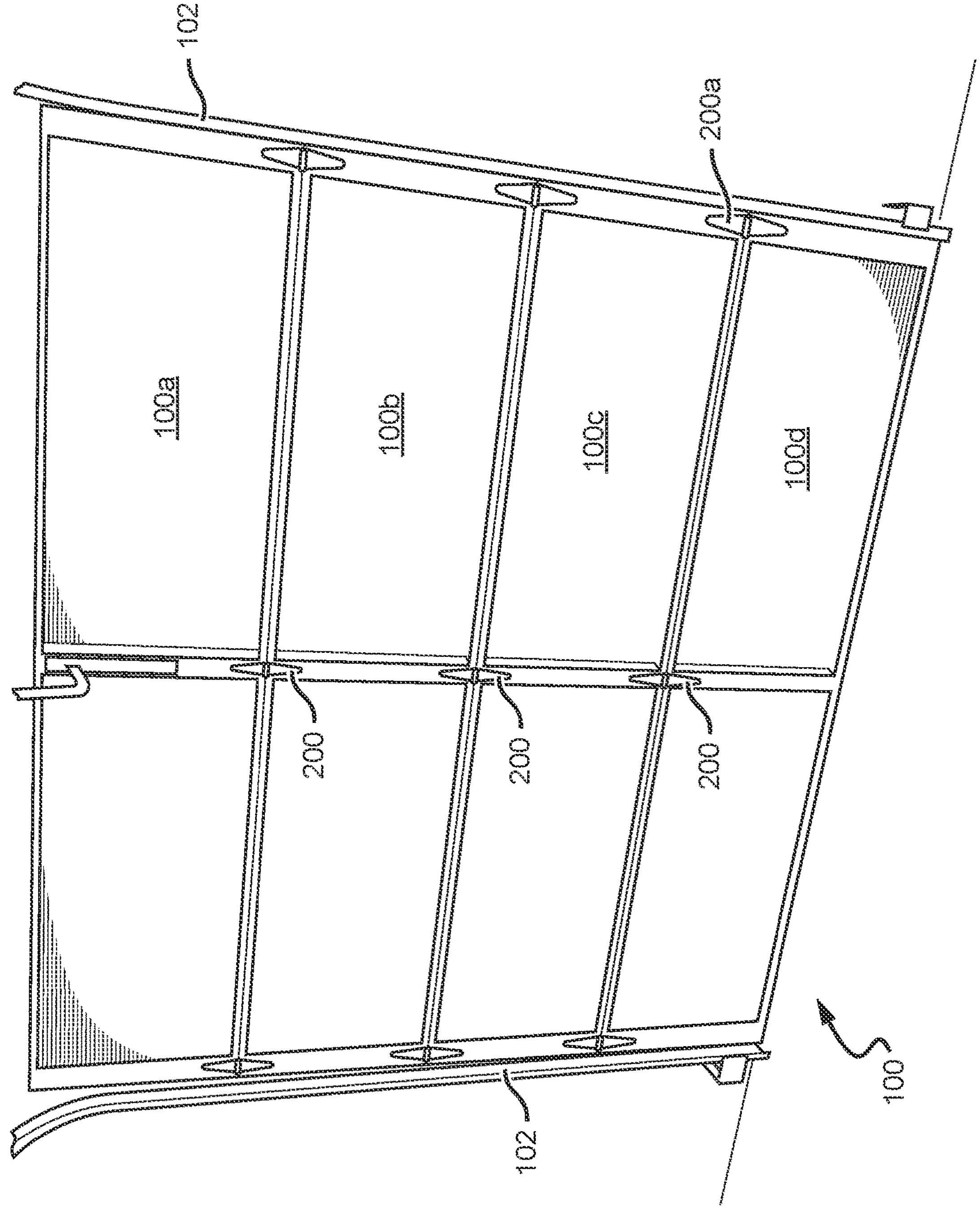
FIG. 1 PRIOR ART
FIG. 1 shows a prior art garage door.
Figure 2:
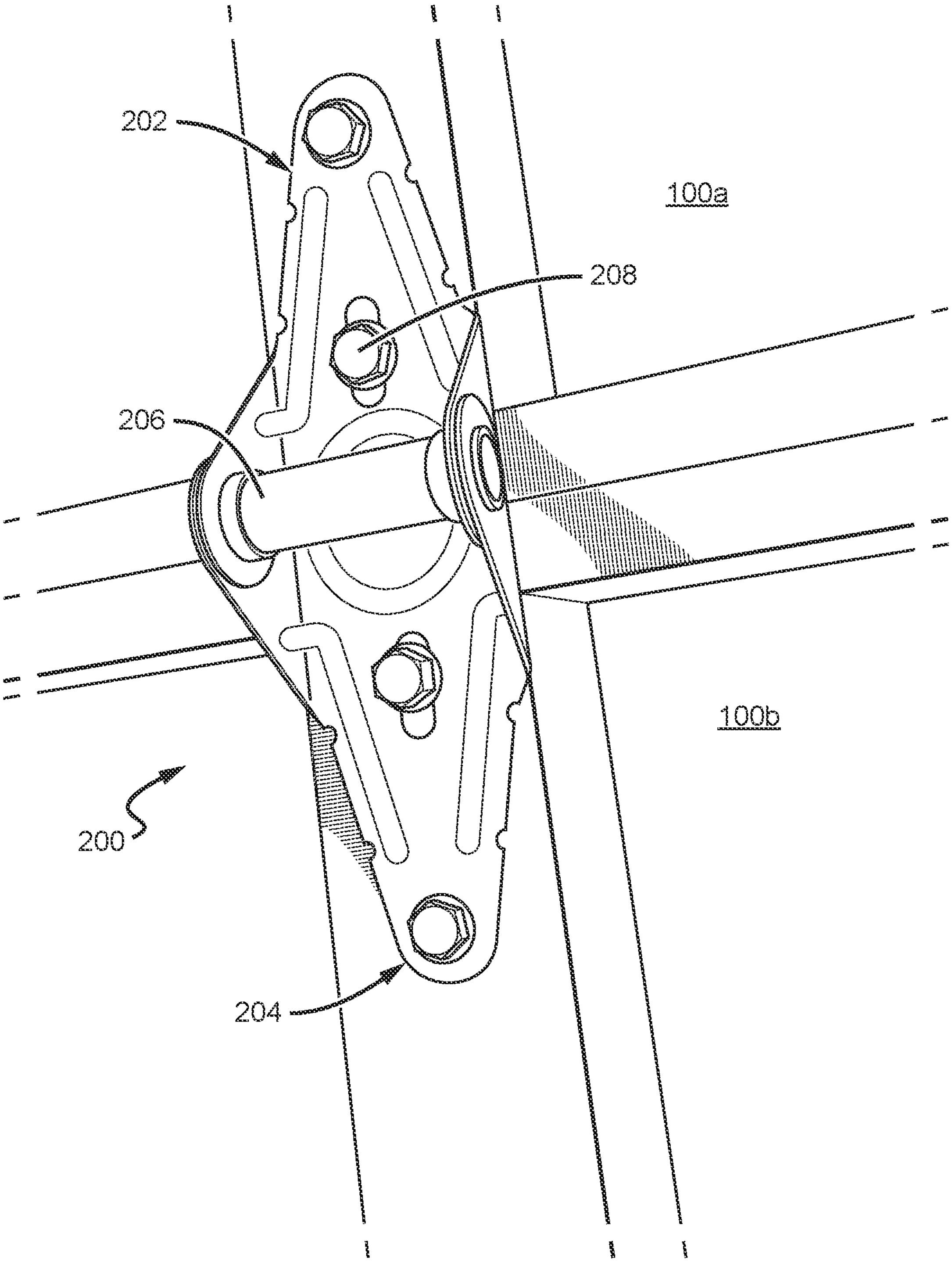
FIG. 2 PRIOR ART
FIG. 2 shows a prior art garage door hinge.

This disclosure relates generally to protecting roller devices and assemblies that prevent damage caused by doors, such as garage doors. The protecting roller devices can include two separable portions each having a wheel at one end, with a connection portion therebetween. In some embodiments, the connecting portion passes through a hollow axle of the hinge to connect the separable portions. In some other embodiments, the protecting roller device can comprise a middle portion that can be connected to the hinge, such as using a fastener. The highest point of the protecting roller device can be above the highest point of the hinge, such that the protecting roller device will encounter an obstruction such as a car instead of the hinge. The protecting roller device can be made of a material designed to prevent or minimize damage to the obstruction.

Embodiments of the disclosure are described herein with reference to illustrations that are schematic illustrations of embodiments of the disclosure. As such, the actual size, components and features can be different, and variations from the shapes of the illustrations as a result, for example, of technological capabilities, manufacturing techniques and/or tolerances are expected. Embodiments of the disclosure should not be construed as limited to the particular shapes or components of the regions illustrated herein but are to include deviations in shapes/components that result, for example, from manufacturing or technological availability. The regions illustrated in the figures are schematic in nature and their shapes are not intended to illustrate the precise shape or functionality of a feature of a device and are not intended to limit the scope of the disclosure. In addition, components may be shown as one unit but may instead be a collection of components or units, or a collection of components or units may exist as one unit.

Throughout this description, the preferred embodiment and examples illustrated should be considered as exemplars, rather than as limitations on the present disclosure. As used herein, the term "disclosure," "device," "method," "present disclosure," "present device" or "present method" refers to any one of the embodiments of the disclosure described herein, and any equivalents. Furthermore, reference to various feature(s) of the "disclosure," "device," "method," "present disclosure," "present device" or "present method" throughout this document does not mean that all claimed embodiments or methods must include the referenced feature(s).

It is also understood that when an element or feature is referred to as being "on" or "adjacent" another element or feature, it can be directly on or adjacent to the other element or feature, or intervening elements or features may also be present. It is also understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure. As used herein, the term "and/or" includes any and all combinations of one or more of the associated list items.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Figure 3A:
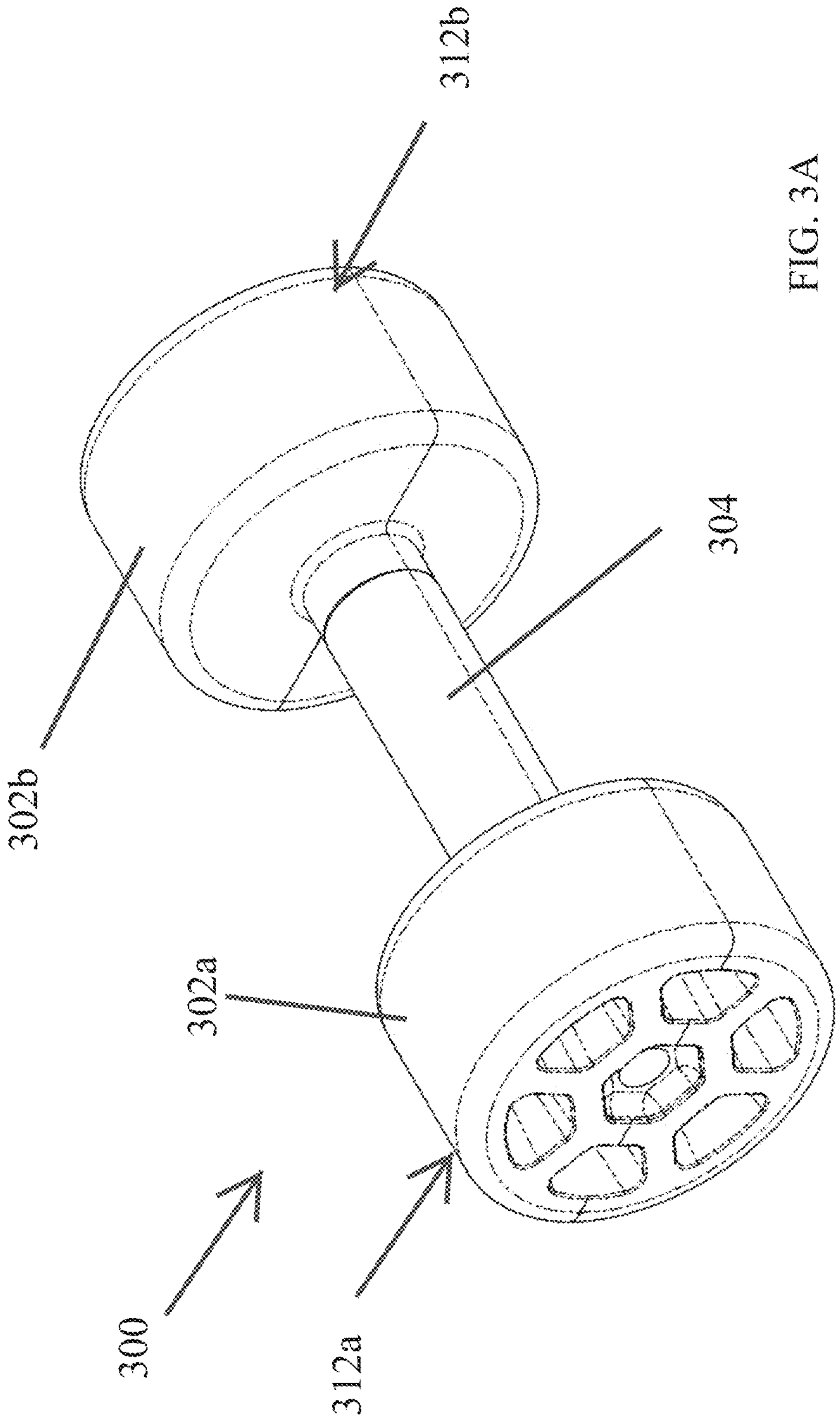
FIGS. 3A and 3B show a protector for use with a door, according to one embodiment of the present disclosure, with FIGS. 4A and 4B showing the protector in a disassembled state.
Figure 3B:
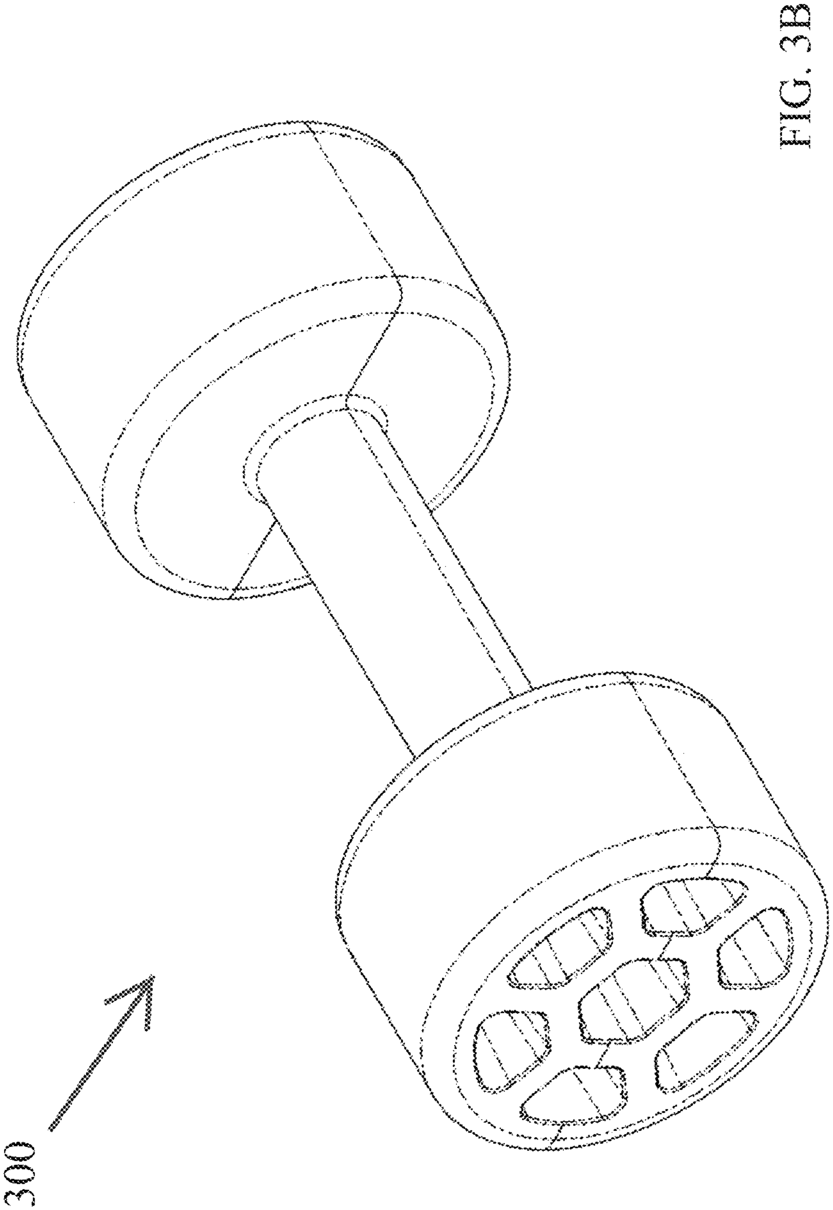
Figure 4A:
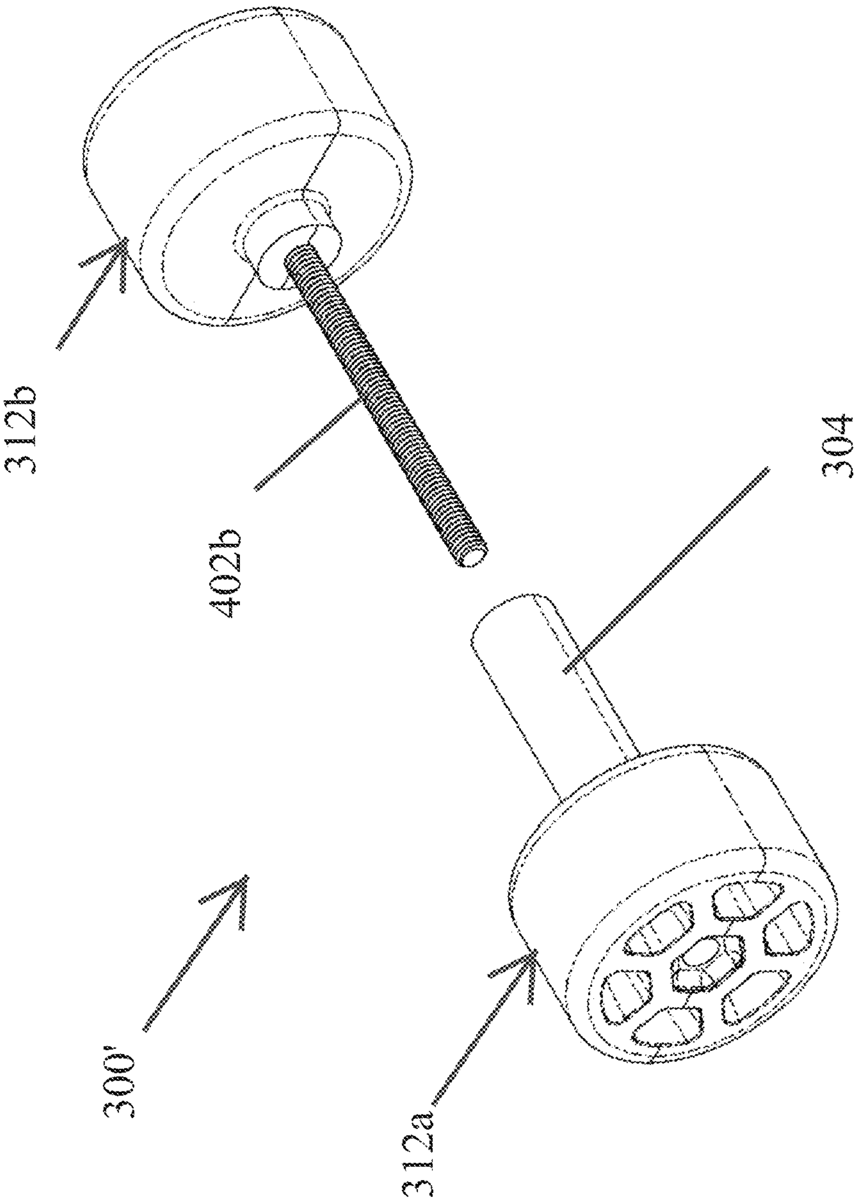
Figure 4B:
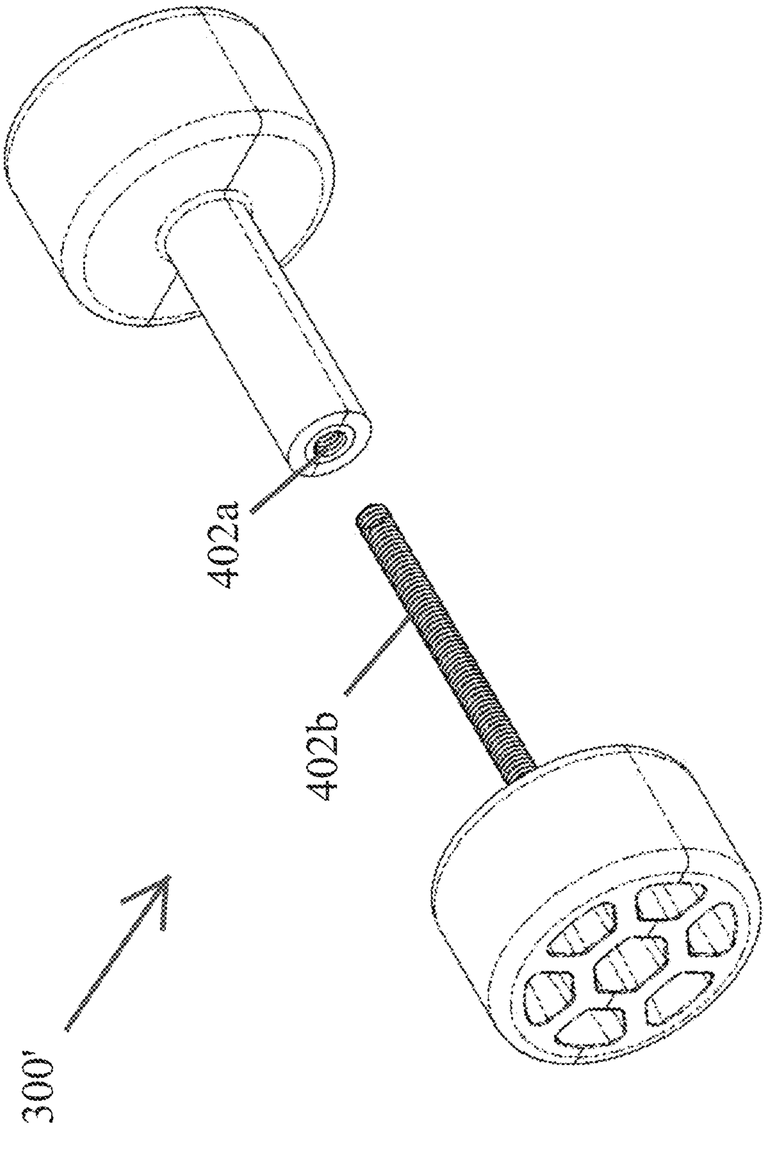
Figure 5A:
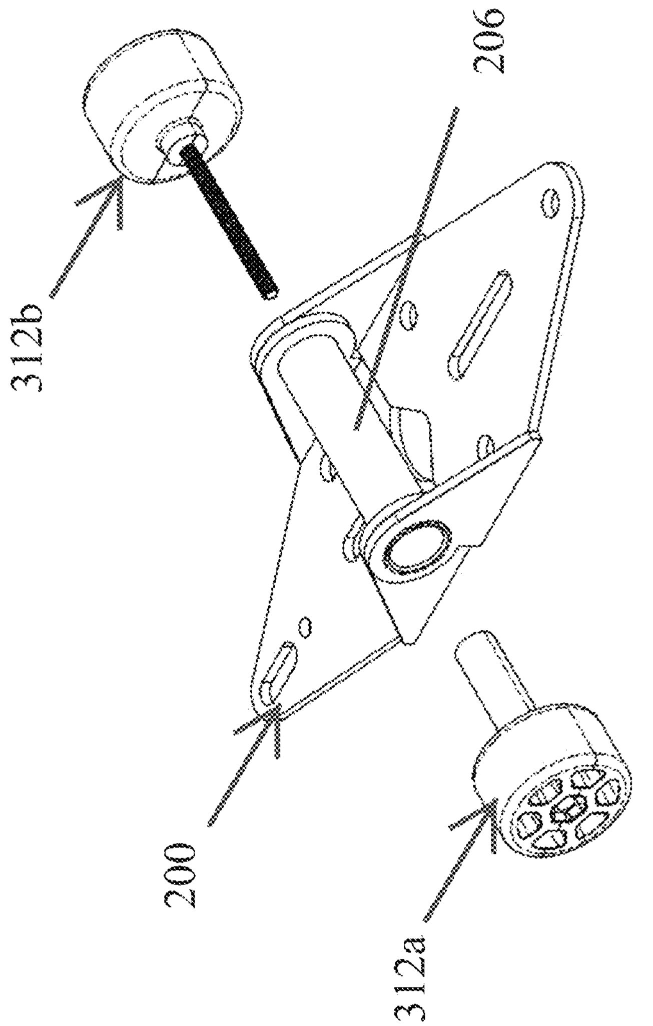
FIGS. 5A-6B show the device from FIGS. 3A-4B in conjunction with a prior art hinge.
Figure 5B:
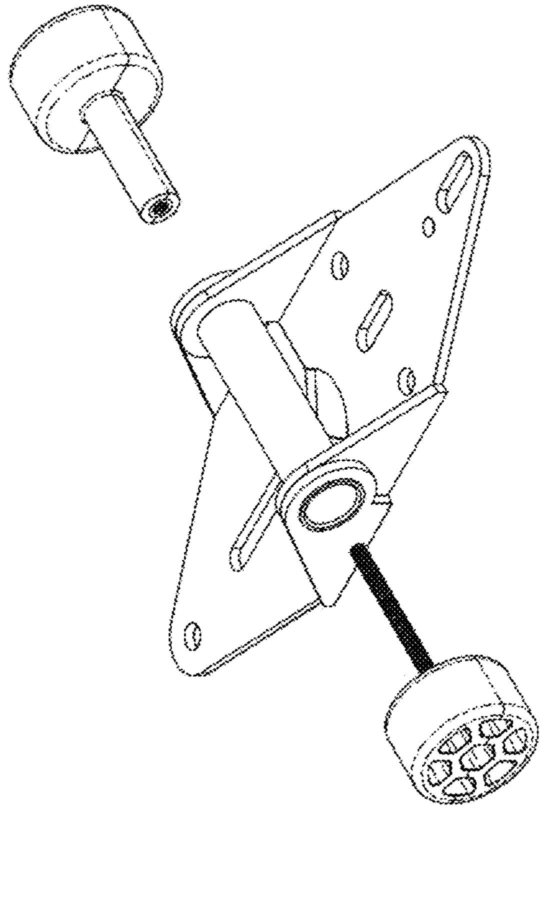
Figure 6A:
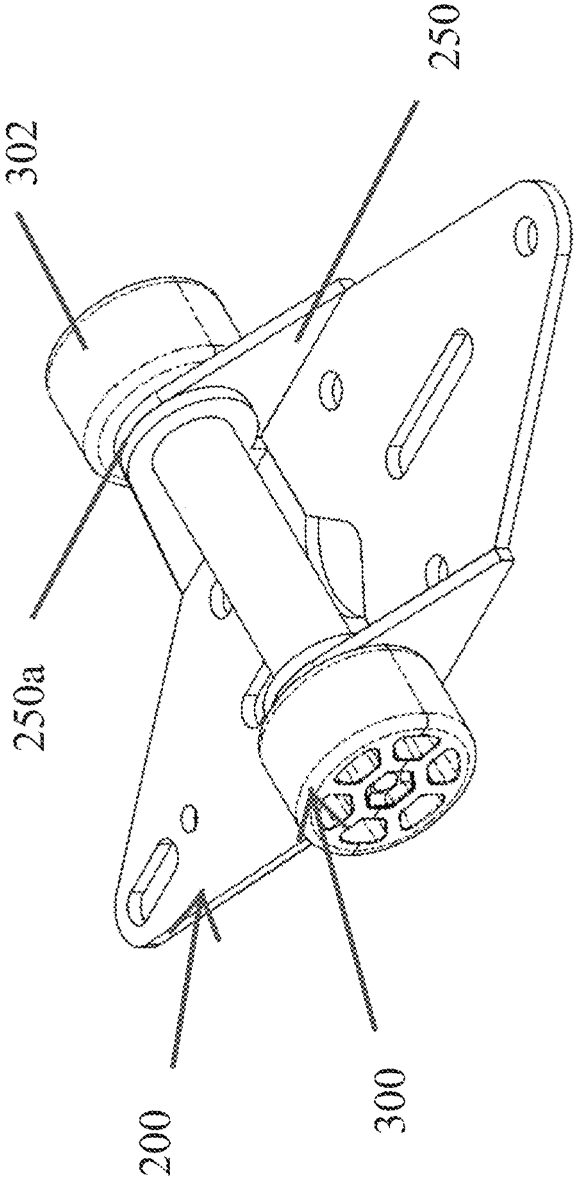
Figure 6B:
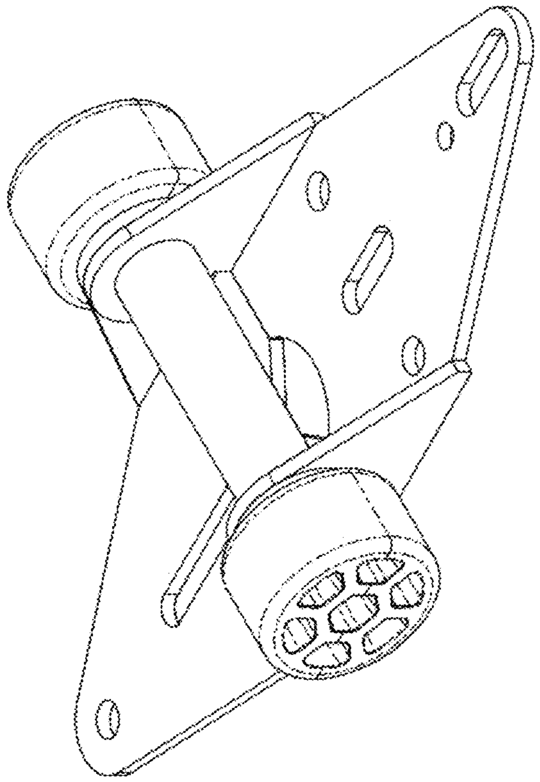

FIGS. 3A and 3B show a device 300 according to one embodiment of the present disclosure, with FIGS. 4A and 4B showing the device 300' in a disassembled state. The specific device 300 is a roller device and includes two wheels 302 (though non-wheel, rolling, and/or rotating elements are also possible, as are non-rolling/non-rotating embodiments) as well as a connecting portion 304, though it is understood that other embodiments are possible.

As best seen in FIGS. 4A and 4B, the device 300 can include two separable portions 312*a*,312*b*, each including a respective one of the wheels 302*a*,302*b*. The portions 312*a*, 312*b* can be connected to each other via the connecting portion 304, such as via a male/female connection, a threaded/screwed connection, other connection methods known in the art, and combinations thereof. In the specific embodiment shown, the first portion 312*a* includes a receiver 402*a*, while the second portion 312*b* includes a threaded connector 402*b*. The threaded connector 402*b* can be screwed into the receiver 402*a* so as to connect the portions 302*a*,302*b*. The portions 312*a*,312*b* will thus be connected to one another and will rotate with one another, though it is understood that other embodiments are possible, including embodiments where the portions 312*a*,312*b* and/or wheels 302*a*,302*b* rotate separately from one another.

FIGS. 5A-6B show the device 300 being connected to a hinge such as the hinge 200. The separability of the portions 312*a*,312*b* allows for the connecting portion 304 with receiver 402*a* and the threaded connector 402*b* to be connected within the hollow of the axle 206. The combination of the hinge 200 and device 300, seen in FIGS. 6A and 6B, can then be connected to a garage door such as the door 100; or alternatively, the device 300 can be installed on a hinge 200 that is already connected to the garage door 100, such as via fasteners 208.

The device 300 can be sized so that it protrudes from the garage door further than the hinge (e.g., more than the outermost portion of the hinge). For instance, in the specific embodiment shown in FIGS. 6A and 6B, the wheels 302 are above the highest point 250*a* of the hinge protrusion 250. Thus, as the garage door 100 is closing, an object in the way of the door (e.g., the rear or front of a car) is more likely to encounter the device 300, such as the wheels 302, than to encounter the hinge 200, which is often metal. The device 300, such as via the wheels 302, can then rotate along the object to minimize damage. In some instances, this may cause the garage door 100 to itself be pushed outward as it closes. In some embodiments, the wheels 302 can have a diameter of 0.5" to 3", 1" to 2", 1" to 1.75", 1.25" to 1.5", and/or about 1.375". Many different sizes and embodiments are possible.

The device 300 (and/or the wheels 302 thereof) can comprise and/or be made of a material meant to minimize damage. For instance, in one embodiment, rubber and/or nylon can be used for this purpose. The material can also be lubricated, which can aid in minimizing damage. Other materials and/or coatings as known in the art can be used. The material(s) can in some embodiments be softer, more flexible, and/or more pliable than metal such as that of the garage door and/or hinge.

Figure 7A:
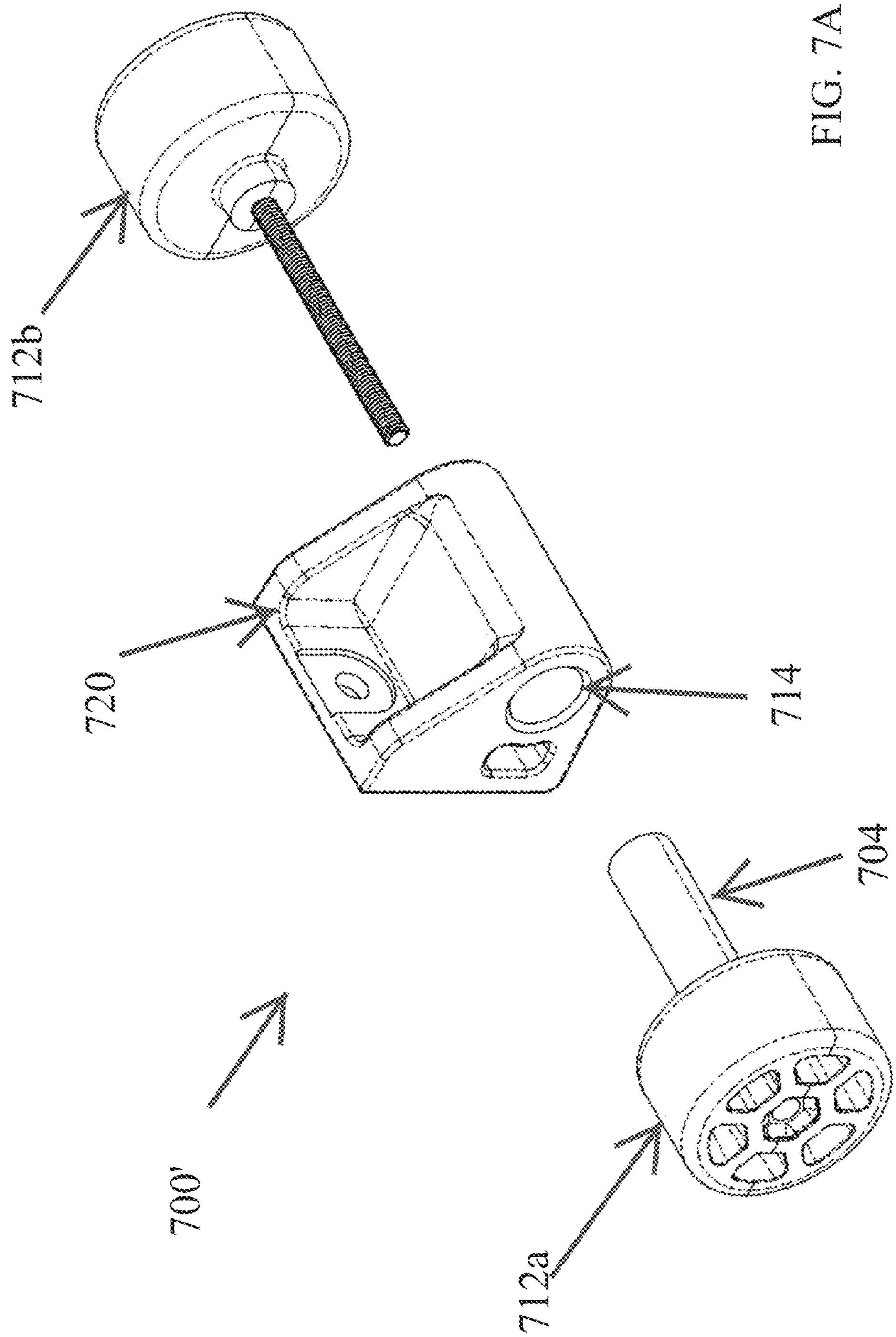
FIGS. 7A-8B show a protector for use with a door, according to another embodiment of the present disclosure, with FIGS. 7A and 7B showing the protector in a disassembled state and FIGS. 8A and 8B showing the protector in an assembled state.
Figure 7B:
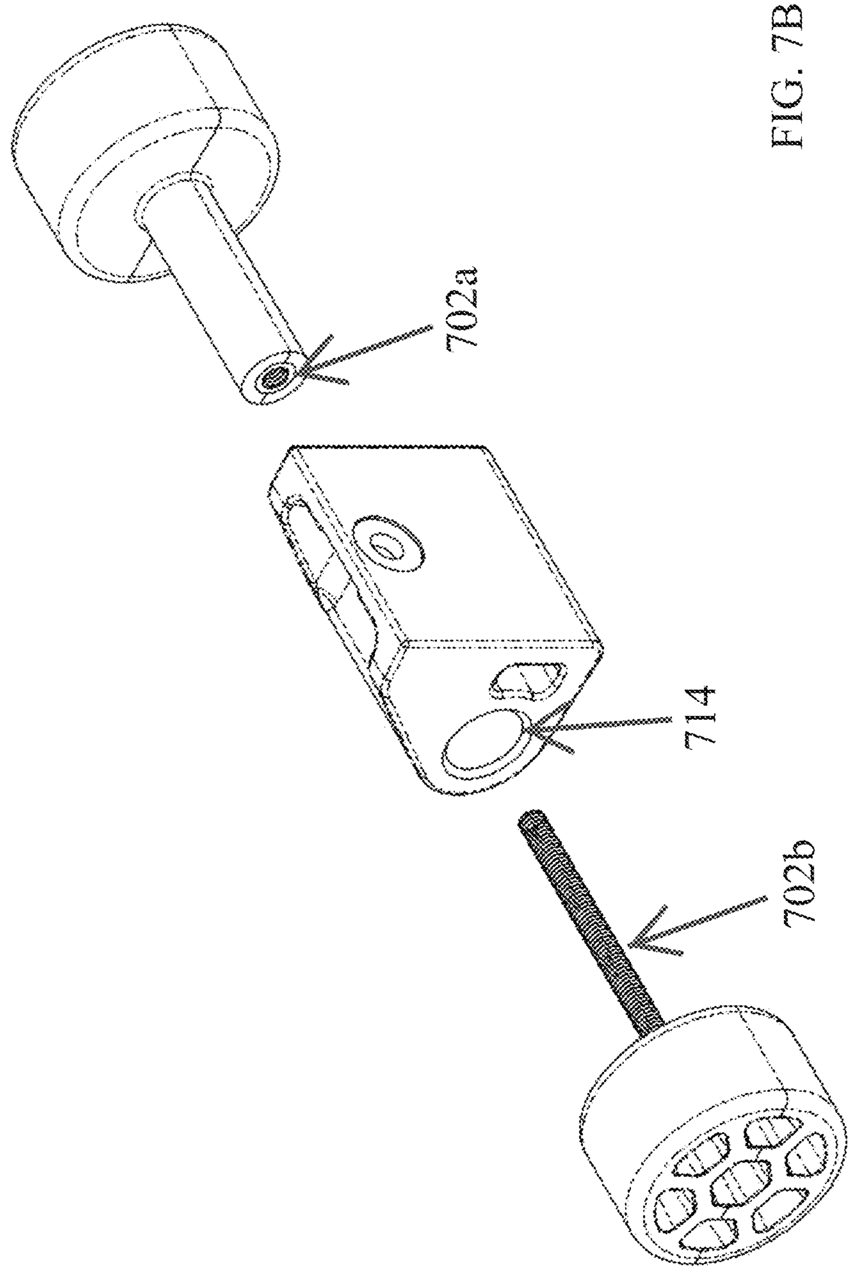
Figure 8A:
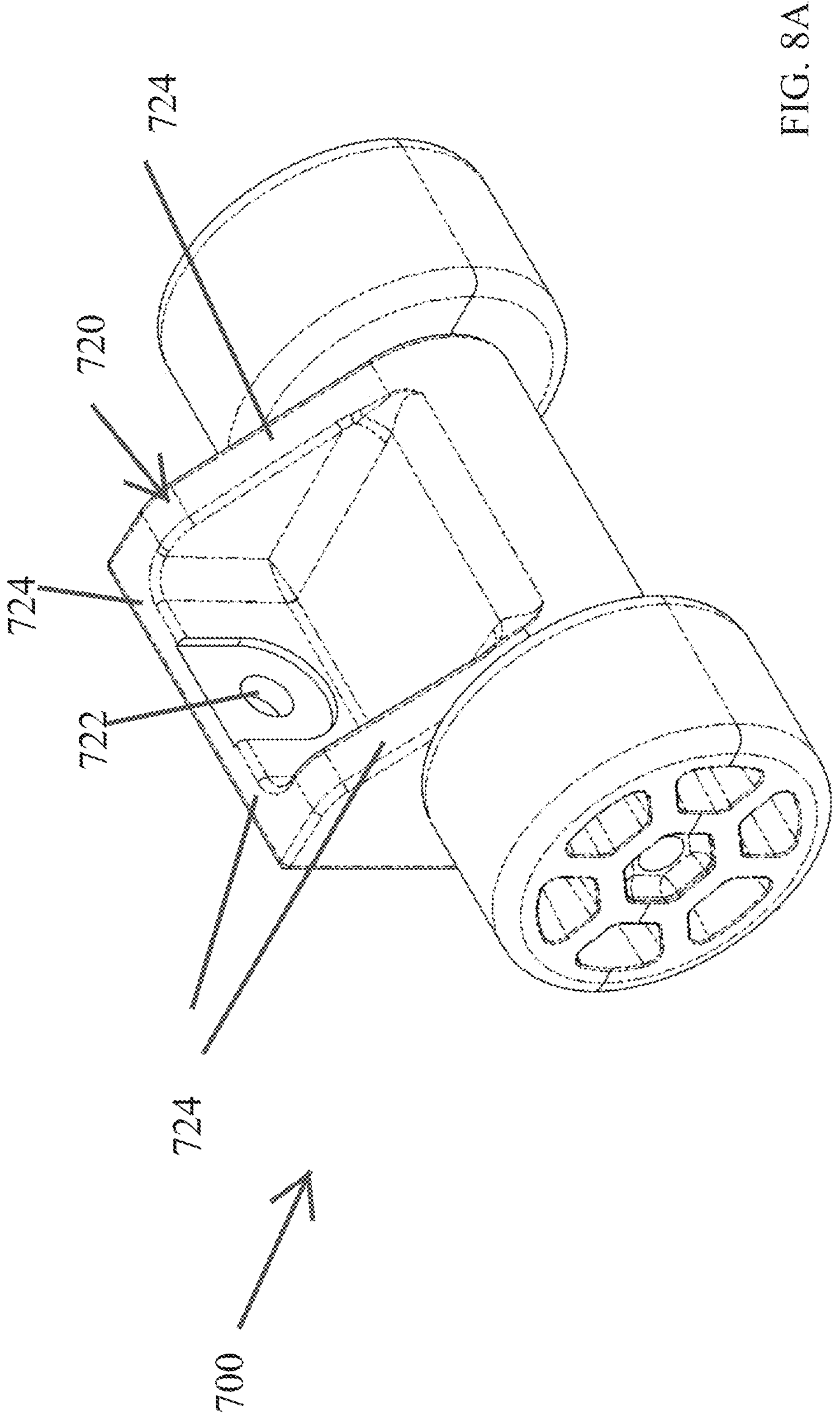
Figure 8B:
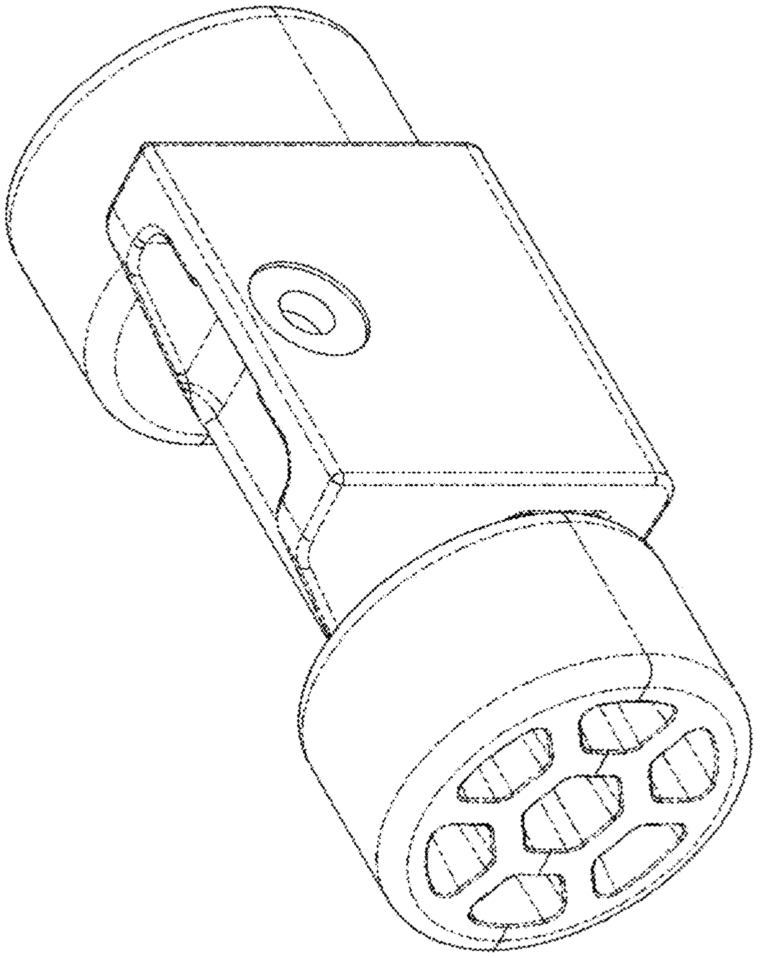

FIGS. 7A-8B show another device 700 according to another embodiment of the present disclosure, with the device 700' shown in a disassembled state in FIGS. 7A and 7B. The device 700 can include first and second portions 712*a*,712*b*, which can be the same as or similar to the first and second portions 312*a*,312*b*. Additionally, the device 700 can include a middle portion 720. The device 700 (including but not limited to the middle portion 720) can be made of the same or similar materials to the device 300 discussed above with regard to FIGS. 3A-6B.

The middle portion 720 of the device 700 can also include a hollow portion 714 similar to the hollow of the axle 206 of the hinge 200 shown in FIGS. 5A-6B. In one embodiment, the first and second portions 712*a*,712*b*, which can be the same or similar to the first and second portions 312*a*, 312*b*, are separable. The separability of the portions 712*a*, 712*b* allows for the connecting portion 704 with receiver 704*a* and the threaded connector 704*b* to be connected within the hollow portion 714 of the middle portion 720.

Figure 9:
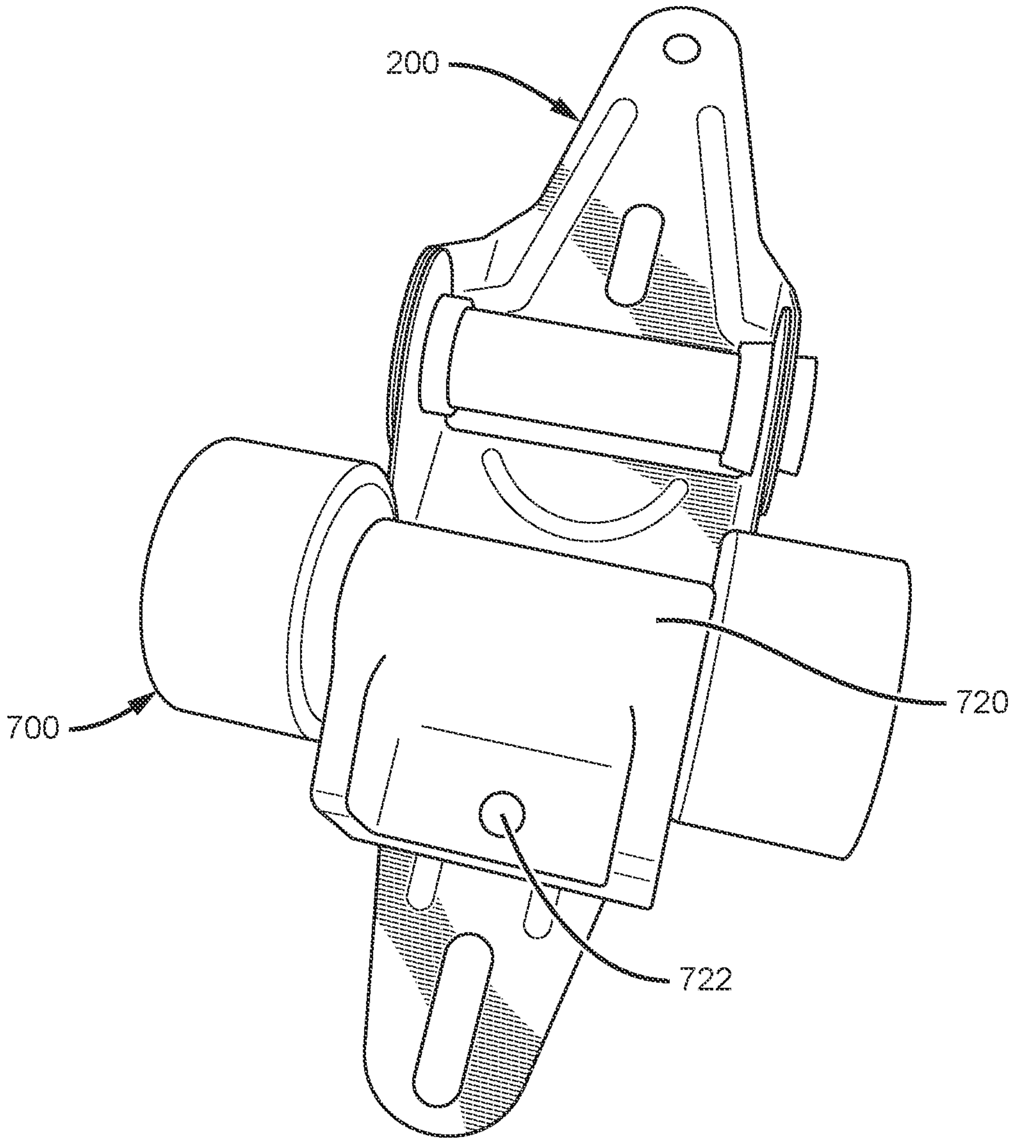
FIG. 9 shows the device from FIGS. 7A-8B in conjunction with a prior art hinge.

When attaching the hinges 200 to a garage door 100, users sometimes fail to fully screw in the connecting fasteners 208, and/or the fasteners 208 became loose over time. These fasteners 208 can stick out from the hinge 200 and cause damage to objects such a cars. The middle portion 720 can help to prevent this damage. The middle portion 720 can include a fastener aperture 722, through which a fastener 208 can pass to connect the device 700 (including middle portion 720) to the hinge 200 (e.g. the lower portion of the hinge 200), and also to connect the hinge 200 to the garage door 100. For instance, the device 700 and fastener aperture 722 can be aligned as shown in FIG. 9, and a fastener can then be passed through the fastener aperture 722 and hinge 200 for connection to the garage door.

The shape of the middle portion 720 can prevent damage from loose screws. For instance, the middle portion 720 can be shaped such that an impediment (e.g., a car) in the way of the garage door closing can encounter the raised edges 724 of the middle portion 720, instead of encountering a loose fastener which would cause more damage. It is understood that other shapes and embodiments than those specifically shown in FIGS. 7A-9 are possible to achieve this goal.

Although the present disclosure has been described in detail with reference to certain preferred configurations thereof both in the specification and in the claims, other versions are possible. For instance, while the embodiments are commonly described with regard to center hinge 200, it is understood that the concepts and elements described herein could be applied to side hinges 200*a*. Embodiments of the present disclosure can comprise any combination of compatible devices/features described herein and/or shown in the figures, and these embodiments should not be limited to those expressly illustrated and discussed. For instance and not by way of limitation, the appended claims could be modified to be multiple dependent claims so as to combine any combinable combination of elements within a claim set, or from differing claim sets. The spirit and scope of the disclosure should not be limited to the versions described above.

The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

I claim:

1. A protecting roller device comprising:

a first portion comprising a first wheel;

a second portion comprising a second wheel, said first and second portions separable from one another;

a middle portion between said first portion and said second portion, said middle portion shaped to define a hollow portion; and a connecting portion passing through said hollow portion and connecting said first and second portions.

2. The protecting roller device of claim 1, wherein said first and second wheels are of an equal diameter of 0.5" to 3".

3. The protecting roller device of claim 1, wherein said first and second wheels are made of rubber.

4. The protecting roller device of claim 1, wherein said first and second wheels are made of nylon.

5. The protecting roller device of claim 1, wherein said first and second wheels are lubricated.

6. The protecting roller device of claim 1, wherein said connecting portion comprises a male/female connection.

7. The protecting roller device of claim 1, wherein said connecting portion comprises a threaded connector connected to said first portion and a receiver connected to said second portion, said threaded connector and said receiver along a rotating axis of each of said first and second wheels.

8. The protecting roller device of claim 1, configured to be connected to a hinge, with said connecting portion passing through a hollow of an axle of said hinge to connect said first and second portions.

9. The protecting roller device of claim 8, connected to said hinge, wherein a highest point of each of said first and second wheels is above a highest point of said hinge.

10. The protecting roller device of claim 1, wherein said middle portion further comprises a fastener aperture configured to allow a fastener to pass therethrough to connect the device to a hinge or garage door.

11. The protecting roller device of claim 10, wherein said middle portion further comprises raised edges around said fastener aperture.

12. A protecting roller assembly comprising:

a hinge; and a protecting roller device connected to said hinge, said protecting roller device comprising:

a first portion comprising a first wheel;

a second portion comprising a second wheel;

a middle portion shaped to define a hollow portion; and a connecting portion passing through said hollow portion and connecting said first and second portions.

13. The protecting roller assembly of claim 12, wherein said first and second portions are separable from one another.

14. The protecting roller assembly of claim 12, wherein said first and second wheels are of an equal diameter of 0.5" to 3".

15. The protecting roller assembly of claim 14, wherein a highest point of each of said first and second wheels is above a highest point of said hinge.

16. The protecting roller assembly of claim 12, wherein a highest point of each of said first and second wheels is above a highest point of said hinge.

17. The protecting roller assembly of claim 12, wherein said connecting portion passes through a hollow axle of said hinge.

18. The protecting roller assembly of claim 12, wherein said middle portion is connected to said hinge by a fastener.

* * * * *